Nov. 11, 1958  F. REYNAUD ET AL  2,860,047
PROCESS OF REMOVING ARSENIC FROM HYDROCHLORIC ACID
SUSPENSIONS OF ARSENIDE AND SULPHARSENIDE
ORES UTILIZING GASEOUS CHLORIDE
Filed April 19, 1956
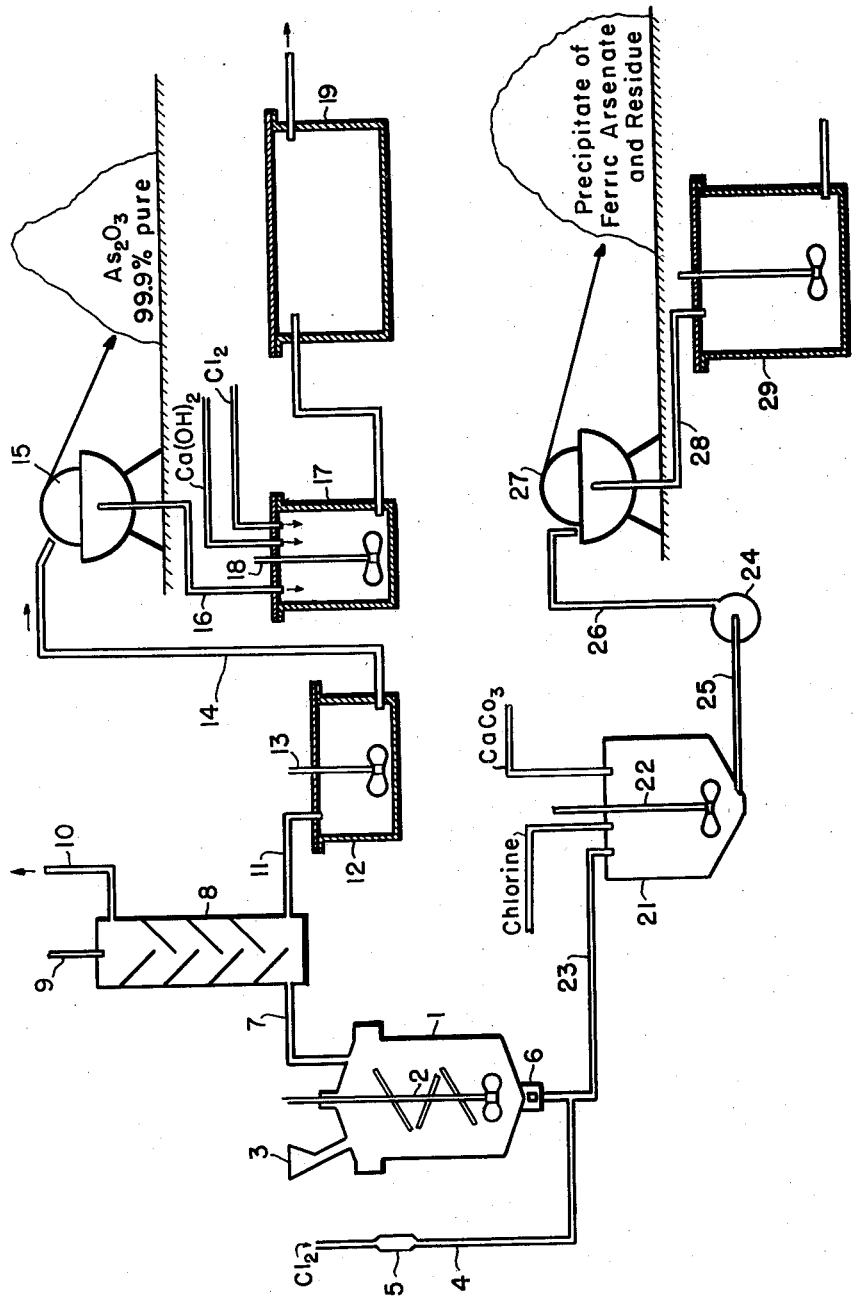
INVENTORS.
Francis Reynaud
Guy Gravey
Andre Roth
BY Webb, Mackey + Burden
THEIR ATTORNEYS

United States Patent Office 2,860,047
Patented Nov. 11, 1958

---

2,860,047

PROCESS OF REMOVING ARSENIC FROM HYDROCHLORIC ACID SUSPENSIONS OF ARSENIDE AND SULPHARSENIDE ORES UTILIZING GASEOUS CHLORIDE

Francis Reynaud, Guy Gravey, and André Roth, Pombliere, France, assignors to Societe d'Electro-Chimie d'Electro-Metallurgie et des Acieries Electriques d'Ugine, Paris, France, a corporation of France Application April 19, 1956, Serial No. 579,174

Claims priority, application France April 20, 1955

1 Claim. (Cl. 75—112)

The arsenide or sulpharsenide ores, particularly of cobalt and/or of nickel are generally subjected to either a smelting or roasting, or to a smelting followed by a roasting, before being chemically treated in any case. The object of these operations is to remove any large proportion of arsenic present in the ore which is collected in the form of $As_2O_3$ and to oxidize, at least partially, the metallic elements contained in the ore.

In the course of the usual wet treatment of the ore, the arsenic is removed in the form of ferric arsenate having a ponderal ratio of iron to arsenic about equal to 1. Thus, one of the advantages of previous roasting or smelting of the ore is to remove a large proportion of the arsenic and to limit, or even to avoid, a further addition of iron which, otherwise, would have been necessary in order to obtain this ponderal ratio of about 1. The roasting, by removing some of the arsenic in the ore, reduces the weight and the volume of the ultimately precipitated ferric arsenate and, at the same time, reduces the amount of cobalt adsorbed in the course of the precipitation of the ferric arsenate.

The present invention accomplishes in one operation what previously required two operations, the roasting operation and the acidic and oxidation attack which normally followed it.

According to the present invention, arsenide or sulph-arsenide ore containing various metals, among which one at least is cobalt, nickel, and/or iron in the form of arsenides is mixed with hydrochloric acid to form a suspension. Chlorine gas is diffused into the suspension to convert the greater part of the arsenic into arsenous chloride and the cobalt, nickel and iron into chlorides. The suspension is maintained at a temperature sufficient to evolve arsenous chloride gas but leave the chlorides of cobalt, nickel and iron in solution. The rate of chlorine diffusion is such that substantially all of it is absorbed by the suspension and the gaseous phase above the suspension is free of chlorine. The rate of addition is lowered progressively until it is impossible to avoid the appearance of an excess of chlorine in the gaseous phase. The evolved arsenous chloride gas is withdrawn from the suspension and treated to recover arsenic trioxide therefrom. The introduction of chlorine into the suspension from which the arsenous chloride has been separated is continued at a low rate in order to oxidize the remaining arsenic in the suspension into arsenic acid. The solution is afterwards neutralized to remove from it the iron and the arsenic in the form of ferric arsenate. The suspension which now is free of iron and arsenic, but which contains cobalt and nickel and also gold, if gold was present in the initial ore, is treated to separate these metals.

The single figure of drawing represents in a diagrammatic manner apparatus suitable for carrying out the process.

The arsenide or sulpharsenide ore treated according to the present invention may be smaltine which is a complex mixture of various minerals such as $CoAs_2$, $CoAs_3$, $(Co, Ni)As_2$, $(Co, Ni, Fe)As_3$ and $FeAs_2$. The composition of this ore varies; however an exemplary smaltine composition may be:

| | | |
|---|---|---|
| As | percent | 52.5 |
| Fe | do | 9.04 |
| Co | do | 11.4 |
| Ni | do | 1.18 |
| $SiO_2$ | do | 6.10 |
| Au | g./metric ton | 10 |

Referring more particularly to the accompanying drawing, a raw smaltine ore is crushed to pass through a 200 mesh screen and is put in suspension in about 4 Normal hydrochloric acid in reaction tank 1 provided with a stirrer 2. The ore is supplied to the reaction tank through a funnel 3. The suspension preferably comprises one part of acid to 4 parts of the ore. The suspension is stirred and when it is homogeneous, chlorine gas is diffused into it through a pipe 4 provided with a flowmeter 5 and also provided with a porous diffuser 6. The temperature is brought, either due to the reaction itself or by the complementary use of a heater, to a temperature at which arsenous chloride gas is evolved but the chlorides of iron, cobalt and nickel are left in solution in the suspension. This temperature is maintained between 90–115° C. and preferably about 105–110° C. Initially the rate at which the chlorine gas is diffused into the suspension is such that it is all absorbed and none is revealed in the gaseous phase above the suspension. This rate of addition is lowered progressively up to the point where the presence of an excess of chlorine cannot be avoided in the gaseous phase above the suspension. This excess can be detected by any known means. At this point, about 75 to 80% of the arsenic initially present in the ore has been evolved as arsenous chloride, $AsCl_3$, which has passed through pipe 7 into a hydrolysis column 8 maintained under slight vacuum. Water supplied to the column through a pipe 9 flows downwardly through the column as the arsenous chloride flows upwardly through the column and escapes through an outlet 10. The reaction involved in the hydrolysis of the arsenous chloride is represented by the equation:

(1) $\quad 2AsCl_3 + 3H_2O = As_2O_3 + 6HCl$

The suspension of arsenic trioxide is passed through a pipe 11 to a tank 12 provided with a stirrer 13 and then through a pipe 14 to a filter 15 which separates pure arsenic trioxide from the solution. The filtrate containing some arsenic is passed by a pipe 16 into a tank 17 provided with a stirrer 18 and chlorine and calcium hydroxide are added to form a precipitate of calcium arsenate which is then separated in a filter 19.

The principal reactions occurring in the reaction tank 1 when chlorine gas is diffused into the suspension may be represented by the following equations:

(2) $\quad Cl_2 + H_2O \rightleftarrows HClO + HCl$ (3)

$$MeAs_n + \frac{3n+2}{2} HClO + \frac{n-2}{2} H_2O \rightleftarrows nHAsO_2 + MeCl_2 + \frac{3n-2}{2} HCl$$

("Me" represents particularly cobalt, nickel or iron or a mixture of these metals.)

(4) $\quad HAsO_2 + 3HCl \rightleftarrows AsCl_3 + 2H_2O$

From Equation 1 it is seen that chlorine gas and water react to form hypochlorous acid and hydrochloric acid. According to Equation 3, the metal arsenides are oxidized by the hypochlorous acid to form arsenious acid, $HAsO_2$, and the arsenious acid reacts with hydrochloric acid according to Equation 4 to produce arsenous chloride which, at the temperature employed, is evolved as a gas.

The treatment of the suspension by chlorine is continued either in the initial reactor or in another reactor. In this latter case, the suspension is removed from reactor 1 and transferred to a retctor 21 provided with a stirrer 22 and diluted with three times its volume of water. Chlorine gas is then fed into the suspension in reactor 21 through pipe 23 to oxidize and dissolve further quantities of cobalt, nickel and iron and to oxidize the remaining arsenic into arsenic acid. The oxidation potential of the solution is measured continuously during the addition of the chlorine. While the iron, cobalt and nickel were dissolving, the oxidation potential rises slowly but after substantially all of these metals had dissolved, it rises rapidly to an oxidation potential of about 1000 millivolts. It is maintained substantially at this oxidation potential until substantially all of the gold is dissolved. The quantities of arsenic and iron present in solution are determined and if the ponderal ratio of arsenic to iron is more than 1, iron is added to bring the ratio to about 1. The iron is added in the form of ferric chloride. Calcium carbonate solution is then added to the slurry under a controlled pH to cause the precipitation of ferric arsenate. This procedure is described more fully in application Serial No. 579,173, filed April 19, 1956, now Patent No. 2,835,569, granted May 20, 1958. The contents of reaction tank 21 are pumped by a pump 24 through pipes 25 and 26 to a filter 27. The filtrate containing cobalt, nickel and gold is passed through pipe 28 to tank 29 for further treatment to separate these metals from each other.

*Example*

500 kgs. of raw smaltine which had been ground to pass through a 200 mesh screen were introduced into the reaction tank 1 and 125 kgs. of 4 Normal hydrochloric acid were then added to the reaction tank to give a total volume of suspension of about 250 liters. Chlorine gas was then diffused into the suspension at an initial rate of 30 cubic meters per hour and the suspension was heated to and maintained at a temperature of about 110° C. The chlorine input was so regulated that no substantial amount of chlorine was present in the gaseous phase above the suspension. In order to obtain this result, the rate of input of chlorine was progressively lessened as solubilization of the smaltine proceeded. At the end of the operation, the step of the chlorination operation required about 8 hours. The acidity of the medium increased progressively and finally became stable at a value corresponding to the conditions of saturation of the medium, about 6 Normal at the end of the operation. After 8 hours of chlorination, about 78% of the arsenic initially present had been evolved. The volume of the suspension remained constant due to water additions. The arsenous chloride evolved from the suspension passed through the pipe 7 into the hydrolyzer 8 where the arsenous chloride was converted into arsenic trioxide which was separated on the filter 15.

The contents of reactor 1 were transferred to reactor 21 and diluted with water to three times its volume. Chlorine gas was fed to the suspension in reactor 21 as previously described and as described in the previously mentioned application Serial No. 579,173, filed April 19, 1956. The oxidation potential increased slowly and progressively to 1000 millivolts. The oxidation potential was maintained over 1000 millivolts for a time sufficient to dissolve all the metals, including gold if any was present in the initial ore. 7 kgs. of iron in the form of ferric chloride were added to the slurry in reactor 21 in order to bring the ponderal ratio of iron to arsenic to about 1. Calcium carbonate solution was then added to the slurry under a controlled pH to precipitate ferric arsenate and the slurry was filtered.

The solids retained on the filter 27 weighed 260 kgs. and contained 0.55% cobalt and 1 gram of gold per metric ton of ore treated, which corresponded to a yield to extraction of cobalt of about 97.5% and a yield of extraction of gold of 94.8%. The chlorine consumption was 650 kgs. 235 kgs. of crystallized $As_2O_3$ of 99.7% purity were obtained on the filter 15.

The invention is not limited to the preferred embodiment but may be otherwise embodied or practiced within the scope of the following claim.

We claim:

A process of removing large quantities of arsenic from hydrochloric acid suspensions of raw arsenide and sulpharsenide ores containing at least one metal from the group consisting of cobalt, nickel and iron, the weight ratio of arsenic to iron in said ores being substantially greater than 1, which comprises forming a hydrochloric acid suspension of said ore, diffusing chlorine gas into said suspension to convert large quantities of arsenic into arsenous chloride, the remainder of the arsenic into arsenic acid and the metals of the group into chlorides, maintaining the suspension at a temperature between about 90–115° C. to evolve the arsenous chloride out of the suspension while leaving said metal chlorides and said arsenic acid in solution; the rate of chlorine diffusion being such that substantially all of the chlorine is absorbed by the suspension and the gaseous phase above the suspension is free of chlorine; removing the evolved arsenous chloride to change the weight ratio of arsenic to iron to about 1 in said suspension; continuing the chlorine diffusion into the suspension to insure complete conversion of the metal of the group into chlorides and the remaining arsenic into arsenic acid; and then eliminating the arsenic acid and iron from the suspension by precipitating basic ferric arsenate.

References Cited in the file of this patent

UNITED STATES PATENTS

| Re. 9,203 | Mears | May 18, 1880 |
| 937,965 | Schneider | Oct. 26, 1909 |
| 1,571,502 | Venn-Brown | Feb. 2, 1926 |

FOREIGN PATENTS

| 14,398 of 1903 | Great Britain | Sept. 29, 1904 |

UNITED STATES PATENT OFFICE
CERTIFICATE OF CORRECTION

Patent No. 2,860,047                                November 11, 1958

Francis Reynaud et al.

It is hereby certified that error appears in the printed specification of the above numbered patent requiring correction and that the said Letters Patent should read as corrected below.

Column 3, line 8, for "retctor" read -- reactor --; line 49, after "the", last occurrence, insert -- input rate was about 8 cubic meters per hour. This first --.

Signed and sealed this 3rd day of March 1959.

(SEAL)
Attest:

KARL H. AXLINE                                      ROBERT C. WATSON

Attesting Officer                                   Commissioner of Patents